US009705738B2

(12) United States Patent
Freimark et al.

(10) Patent No.: US 9,705,738 B2
(45) Date of Patent: Jul. 11, 2017

(54) SYSTEM FOR CLOUD-MANAGED MOBILE DEVICE ADMINISTRATION

(71) Applicant: GroundControl Solutions, Inc., New York, NY (US)

(72) Inventors: Aaron Freimark, Cold Spring, NY (US); Jeremy Agostino, Brooklyn, NY (US); Ian Ash, Wilton, CT (US)

(73) Assignee: GroundControl Solutions, Inc., New York, NY (US)

( * ) Notice: Subject to any disclaimer, the term of this patent is extended or adjusted under 35 U.S.C. 154(b) by 1 day.

(21) Appl. No.: 14/750,696

(22) Filed: Jun. 25, 2015

(65) Prior Publication Data

US 2016/0006604 A1 Jan. 7, 2016

Related U.S. Application Data

(60) Provisional application No. 62/020,700, filed on Jul. 3, 2014, provisional application No. 62/113,862, filed on Feb. 9, 2015.

(51) Int. Cl.
*H04W 4/00* (2009.01)
*H04L 12/24* (2006.01)
*H04M 1/725* (2006.01)

(52) U.S. Cl.
CPC ...... *H04L 41/0803* (2013.01); *H04L 41/0859* (2013.01); *H04L 41/0869* (2013.01); *H04W 4/001* (2013.01)

(58) Field of Classification Search
CPC ............. H04L 41/0803; H04L 41/0859; H04L 41/0869; H04W 4/001
USPC ................................ 455/419; 709/203, 249
See application file for complete search history.

(56) References Cited

U.S. PATENT DOCUMENTS

| | | | | |
|---|---|---|---|---|
| 8,533,336 | B1 * | 9/2013 | Scheffler | G06F 9/4445 709/226 |
| 8,707,111 | B2 * | 4/2014 | Ye | G06F 11/0709 714/48 |
| 2008/0134276 | A1 * | 6/2008 | Orrell | H04H 20/426 725/132 |
| 2012/0172062 | A1 * | 7/2012 | Altman | G06Q 30/0207 455/457 |
| 2012/0179802 | A1 * | 7/2012 | Narasimhan | H04L 41/046 709/223 |
| 2012/0204068 | A1 * | 8/2012 | Ye | G06F 11/0709 714/57 |

(Continued)

OTHER PUBLICATIONS

International Search Report, Written Opinion of ISA and Search History, PCT/US2015/038225 (Sep. 16, 2015).

*Primary Examiner* — Inder Mehra
(74) *Attorney, Agent, or Firm* — Koffsky Schwalb LLC; Mark I. Koffsky (57) ABSTRACT

An improved system for cloud-managed mobile device administration (MDM) is described. MDM may be implemented with the use of a third-party product that has management features for particular vendors of mobile devices. The cloud-managed mobile device administration and provisioning eases the administrative burden during deployments, and for on-going mobile device administration. Multiple systems may also manage mobile devices after putting the device into supervised mode, instead of being locked into using the computer that provisioned it originally for any subsequent management and administration needs.

20 Claims, 4 Drawing Sheets

(56) References Cited

U.S. PATENT DOCUMENTS

2013/0332524 A1* 12/2013 Fiala .................... H04W 4/001
                                                    709/204
2016/0359962 A1* 12/2016 Serban ................... H04W 4/00

* cited by examiner

SYSTEM FOR CLOUD-MANAGED MOBILE DEVICE ADMINISTRATION

RELATED APPLICATION

This application claims the benefit of U.S. Provisional Patent Application Ser. No. 62/020,700 filed on Jul. 3, 2014, and U.S. Provisional Patent Application Ser. No. 62/113,862 filed on Feb. 9, 2015.

FIELD OF THE DISCLOSURE

The present disclosure relates generally to an improved system for cloud-managed mobile device management and administration. This improved cloud-based system may also be usefully configured to work in various other arts beyond mobile device management and administration.

BACKGROUND

Mobile device management (MDM) is a technology industry term for the administration of mobile devices, such as smartphones, tablets, laptops, and desktop computers. MDM is usually implemented with the use of a third-party product that has management features for particular vendors of mobile devices. Which features can be managed are often dictated by the vendor of the device or device operating system. Before an MDM solution can completely manage a mobile device, the device must go through Mobile Device Provisioning (MDP). Technologies that are currently available for MDP in an enterprise system require individual setups on a device-by-device basis. This leads to significant inefficiencies because each device must be initialized, programmed and updated in order to operate (and continue to operate) in an enterprise system.

Moreover, many enterprises ship company-owned, un-configured and MDM-free mobile devices by the thousands to a distributed workforce, with the expectation that employees properly enable and enroll in company-required MDM. While it is possible to configure these devices individually before shipment, it is very labor intensive, expensive, and prone to human error. There key mobile control features such as supervision are thus often skipped out of expediency. This can lead to security and network vulnerabilities that can threaten the enterprise system.

There are many third-party MDM systems from many different vendors for mobile devices, which may include smartphones, tablets, and other such devices. However, the management of certain mobile device features may often only be accomplished through the use of a specialized application or distribution program provided by that particular hardware vendor. These specialized applications or distribution programs provided the necessary MDP that allowed MDM solutions to more completely control devices. In some cases, mobile devices that go through a vendor's specialized application or distribution program will unlock over 20 additional features after completing the provisioning process. Some examples of features that may only be available after supervising and provisioning a mobile device through that vendor's specialized application or distribution program include: updating the operating system/firmware, setting the lock screen image, setting the wallpaper, and enabling or disabling built-in apps.

Hardware-vendor supplied specialized applications or distribution programs are most often used by enterprises as the first step in managing mobile devices, and often constitute the first MDP step. The device is first run through the hardware vendor supplied specialized applications or distribution programs to provision the device and lay down the base settings. A third party MDM solution may also be installed to further manage the device. In part because of the complexity and cost involved, however, many enterprises are forgoing this first MDP step and are missing out on key management features. Indeed, it is estimated that fewer than 10% of all institutionally owned mobile devices are supervised.

Further, there are a number of drawbacks to using the hardware vendor supplied specialized applications or distribution programs approach. First, the software may only be available on particular hardware and software platforms. Second, once a device is provisioned by a computer running the hardware vendor supplied specialized application, that device is locked to that computer, and only that computer can make changes to that mobile device. If that computer is lost or destroyed, the only available method for un-supervising the mobile device is to go through a factory recovery on it, which involves the wiping of all data on it. Third, apps that are installed onto the mobile device via hardware vendor-supplied specialized application may not be updated later by third-party MDM solutions.

Using the hardware vendor-supplied specialized application approach for MDP also means that enterprises with a distributed workforce that will be working with mobile devices will need to deploy the hardware and software necessary to run the hardware vendor-supplied specialized application to each location. The enterprises will also need to create a process on how the hardware vendor supplied specialized application is configured, and how mobile devices will receive any updates from it. This can be an expensive endeavor, from both a hardware, programming, and personnel perspective.

Furthermore, mobile device usage creates an interesting use case for enterprises. By their very nature, mobile devices are best suited for use out in the field, but the hub of technical knowledge for most enterprises is still located at its headquarters. Without a central way of provisioning and administration of these devices, enterprises are often left with a widely deployed, and hard to manage and support, distribution and provisioning model. Other systems have sought different piecemeal solutions to enterprise mobility administration and provisioning, but there is no standardized way to integrate all the necessary protocols for the hardware, software, networks, updates, provisioning, and general administration of mobile devices that can be widely distributed, yet centrally managed.

The issues described above are some of the reasons for the need for a better way to supervise and manage mobile devices. Without expertise and great expenditure on hardware and personnel, it is difficult to manage both local and remote deployments of devices.

Accordingly, there is a need for an improved system for cloud-managed mobile device administration and provisioning to ease the administrative burden during both small and large scale deployments, and on-going mobile device administration. There is also a need for an improved system to enable multiple systems to manage a mobile device after putting it into supervised mode, instead of being locked into using the computer that provisioned it originally for any subsequent management and administration needs.

BRIEF DESCRIPTION OF THE FIGURES

The accompanying figures, where like reference numerals refer to identical or functionally similar elements throughout

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The improved system for cloud-based managed mobile device administration seeks to improve upon, and overcome, many of the limitations with current approaches to MDP. Instead of having to choose between the expensive and cumbersome process of manually provisioning mobile devices or relying on end users to do it themselves, it is now possible to not only supervise devices quickly and easily but to also keep devices up-to-date with current policies, versioning, and patching through the same mechanism. Once the cloud-based server-side system has been configured, it is possible that all this may be accomplished through merely plugging the device into a computer running a "Launchpad" application or into one of the purpose-built hardware appliances or through a wireless connection. Users may be able to create and deploy particular payloads to particular devices based on numerous inventory checks that may be performed on the device.

The improved system for cloud-managed mobile device administration further automates the provisioning process for mobile devices—which includes activation, supervision, configuration, and MDM enrollment—from the first moment a device is powered on, and long before end-users receive the device. It is as easy as charging a mobile device or having the mobile device otherwise connect to the enterprise network. This yields tangible and immediate ROI in the form of reduced costs and improved compliance with corporate security and use policies.

The system for cloud-managed mobile device administration seeks to leverage all the advantages of the hardware vendor-supplied specialized applications or distribution programs approach, while mitigating as many disadvantages as possible. The result is being able to manage mobile devices right from the box, without the need for a computer running the hardware vendor supplied-specialized application at a single location. This is the first non-hardware-vendor system to be enable to enable supervision on certain mobile devices, which unlocks critical MDM features as mentioned earlier. The supervision process may be triggered by the USB connection, so no user input onto the touch screen of the device is required. The system for cloud-managed mobile device administration can be implemented to manage mobile devices by either running specialized software on any computer that the devices connect to, or through the use of a purpose-built appliance that the devices connect to. The system may handle one-to-one implementations, all the way up to large-scale enterprise rollouts.

The specialized software or purpose-built hardware appliances for the improved system for cloud-managed mobile device administration may connect to, and be managed through, a private cloud which may consist of a completely on-premises system, or a traditional cloud which may consist of an off-premises system that is connected via the Internet. Hybrid solutions may also be implemented, in which there are both on-premises/private-cloud and off-premises/traditional-cloud components.

The system for cloud-managed mobile device administration may also be able to update the mobile device firmware/operating system. Updates are cached on the software application or hardware appliance and may be deployed whenever the administrators are ready to do so. Since the update may be delivered via hard-wired connection, there is no strain on the wireless network, as is the case with deployments performed via traditional methods. Which devices get updated, and when they get updated may be completely customizable. Devices may be updated without the need for erasing them.

In addition to updating the firmware/operating system, the improved system for cloud-managed mobile device administration may also include functionality to deploy system patches and security updates. The system may automatically download and cache the patches and updates, so that they are available for deployment when, and to which devices, the administrator deems appropriate. Similar to the approach taken with firmware/operating system updates, the patches are cached within the software application or on the hardware appliance, and may be delivered to the devices via USB, saving bandwidth on both the WAN and wireless network. The status of device patching, and compliance with policy, may be monitored through the web-based administration console.

The system for cloud-managed mobile device administration may manage devices through the use of a 'Launchpad,' which may be a software application running on a traditional operating system, or a purpose-built hardware appliance. Devices may be hard-wired to the Launchpad unit, potentially through USB or a similar medium, to be managed. Devices may also connect wirelessly these management computers or purpose-built hardware appliances. If devices do connect wirelessly they may be managed just as if they were connected via USB or other similar hard-wire based medium.

Policy-based deployments may be a powerful system which automatically selects and deploys payloads to devices based on policies which have been created and enabled. An example of this would be to create separate policies for certain types of devices, and the system may deploy that device-specific policy only to those type of devices.

The purpose-built hardware appliances may contain enough inputs to accept multiple devices at a single time, perhaps up to and beyond 96 devices to a single unit. The purpose-built hardware appliance may also include the ability to daisy-chain multiple units, or multiple external hubs, together to increase capacity.

There may be several strategies used for deploying payloads—on-demand, policy-based, and time-based. On-demand deployments may deploy to a single, or multiple, Launchpads in a single click. This approach will usually be employed in the situation for testing payloads for later, wider deployments. It may be possible to initiate a one time, on-demand deployment to all devices connected to a particular Launchpad or deploy to specific device that is connected.

The improved system for cloud-managed mobile device administration may also include the capabilities to backup and restore images to/from mobile devices. An image may contain device settings such as time zone, home screen image, icon arrangement, app preferences, among others. Backups may be captured through the Launchpad, and restores may deployed through the Launchpad.

Supervision mode provides a higher level of device management for institutionally-owned mobile devices. This mode allows additional restrictions, such as turning off instant messaging or games, and it provides additional device configurations and features, such as web content filtering, prevent users from deleting apps, silently install & remove apps, disable access to content-sharing applications, configuring a global proxy and enable a single-app mode (App lock or Kiosk Mode). Supervised mode is a setting that can be turned on or off through a configurator. Supervision is used to provide IT administrators with better control over mobile devices. By enabling supervised mode, IT has access to more advanced management capabilities along with enhanced security restrictions.

The following features may only be available if an mobile device is in supervised mode:

1. Single App Mode: Locks a device into a single app (often seen in retail and check in/check out scenarios);
2. Global Proxy: Allows the forcing of all Internet communications through a single proxy server;
3. Enable or disable of file-sharing apps: Allows for the transfer of files wirelessly;
4. Enable or disable instant messaging use: Messages sent through an Internet-based messaging system;
5. Enable or disable data usage for apps: Applications can be prevented from using cellular data;
6. Enable or disable manual profile installations: Allow users to set up their own profiles, and;
7. Enable or disable account modification: Allows changes such as altering a user's account information, mail, contacts and calendar.

Figure 1:
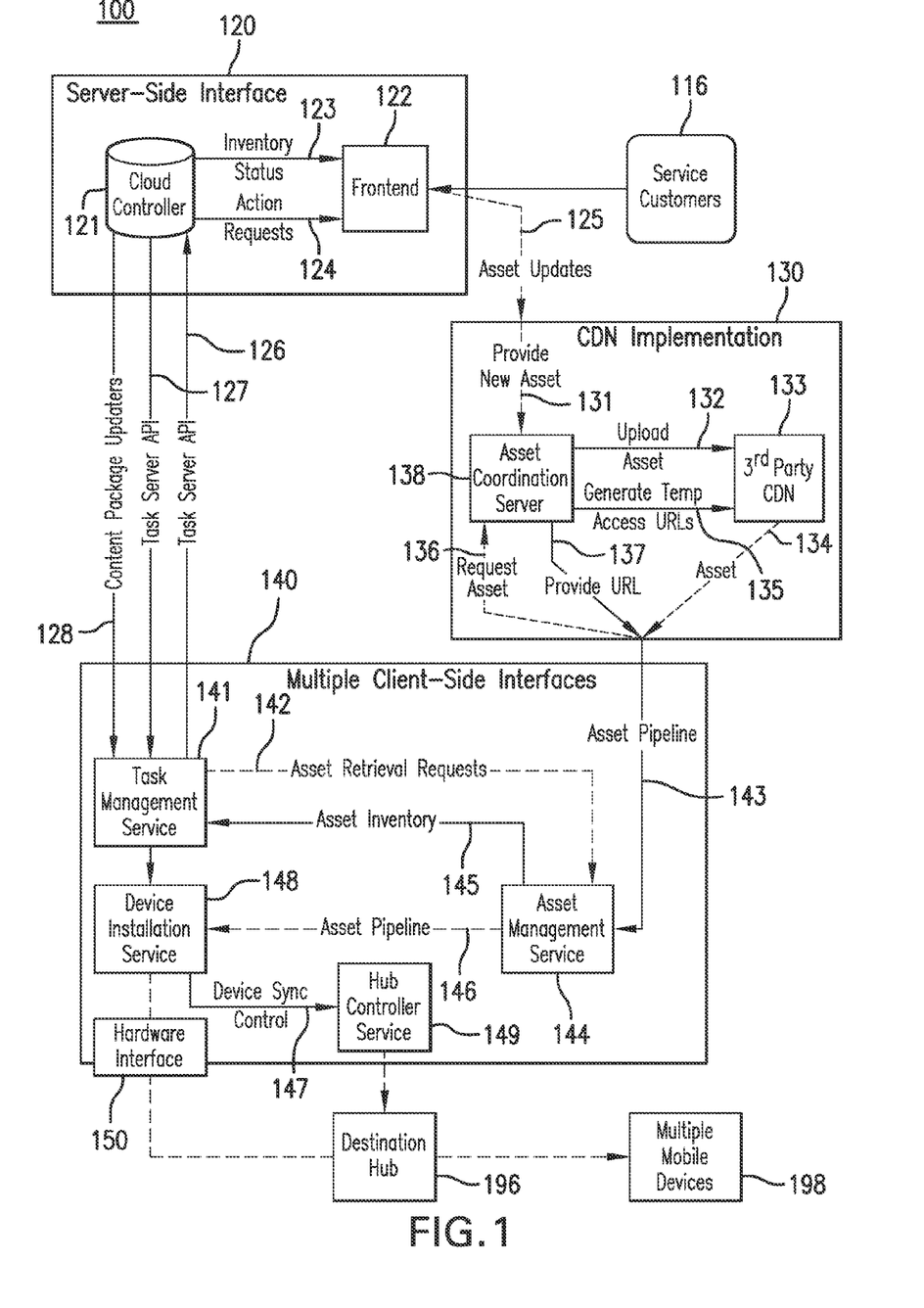
FIG. 1 is a system diagram of an improved system for cloud-managed mobile device administration, in accordance with some embodiments.

Turning to FIG. 1, shown is a system diagram 100 for an improved system for cloud-managed mobile device administration. Shown is the cloud-based server-side 120, customers 116, client-side system 140, content delivery network (CDN) system 130, and mobile device 198. Customer access services via the frontend that is running on the cloud-based server-side. A database running on the server-side may keep track of all customer data, assets, policies, and other relevant information that will need to be stored and retrieved. Firmware updates and patches may be automatically downloaded by the server-side and distributed to client-side systems. Customer policies and payloads may also be stored on the server-side and distributed to that customer's client-side systems. When mobile devices are connected to the client-side system, potentially through a destination hub 196, an inventory of that device will occur, the results of which may be compared against data already on the client-side system or sent to the server-side system, to compare against that customer's policies and payloads. If the device matches a rule based on the results of its inventory scan, then the appropriate policies and payloads will be deployed to that device.

The server-side 120 keeps track of policies, devices that it has seen (i.e., devices that have previously connected to it), assets and payloads that have been defined by the system administrator in the cloud controller 121. The server-side 120 also keeps track of all the Launchpads that are registered with the improved system for cloud-managed mobile device administration. The system administrator and service customers 116 may use the website front end 122 for administration, and an API for the Launchpad that receives the instructions from, and sends status updates to, the server-side. The cloud controller 121 transmits inventory status information 123 and action requests 124 to the frontend 122.

The server-side 120 keeps track of the assets, but it does not store them. Instead, assets are stored in the CDN 130 transferred via the asset updater 125. An asset is a piece of data that is installed on a mobile device such as an image or profile. The CDN 130 has a unique identifier for each asset which is stored on the server-side. Also stored are instructions, which may be include device names and related information.

The CDN 130 may include providing a new asset 131 to an asset coordination server 138. The asset coordination server 138 may provide a URL 137 to the asset pipeline to 143 to the client-side 140. Assets may be requested 136 to the asset coordination server 138 from the asset pipeline. In addition, a $3^{rd}$ Party CDN 133 may be used. In this case, an asset may be uploaded 132 to the $3^{rd}$ Party CDN 133 by generating temporary access URLs 135. Assets are then provided 134 to the asset pipeline 143.

The client-side 140 keeps track of devices that are physically or logically connected, state of those devices, and statistics about the device—such as operating system, device name, amongst others. All of this information about the device is reported by the client-side to the server-side via the API. When a device is disconnected there is no information transfer.

In order for the client-side 140, which may be a computer running the Launchpad software or a purpose-built hardware appliance, to work correctly, it must first be registered to the server-side as part of that enterprise's organization. This process allows an organization to register and use multiple Launchpads or purpose-built hardware appliances, while ensuring, in the traditional cloud model, that organizations can allow administer their devices. This also allows there to be a standardized configuration and data distributed between multiple clients, which may be located near or far from each other. Some of the data that may be distributed includes the cryptographic keys that may be used to lock mobile devices to tampering by unauthorized users. These keys may also be used to restrict access to certain administrative features and functions of the mobile device to users who are privileged through their system account.

With the client-side 140, the asset management service 144 receives assets from the asset pipeline 143 and ultimately transmits 146 them to the device installation service 148. The asset management service 144 transmits asset inventory 145 to the task management service 141 in response to asset retrieval requests 142. The task management service 141 is itself interfaced to the cloud controller 121 on the server-side 120 via a two-way Task Server API 126, 127. The cloud controller 121 also sends content package updaters to the task management service 141.

Also within the client-side 140, the device installation service interfaces with the hub controller service 149 via a device sync control 147. The devices installation service also interfaces with the hardware interface 150. Both the hardware interface 150 and the hub controller service communicate with the destination hub 196 which itself communicates with the mobile device 198.

It may be possible to perform on-the-fly asset personalization during installation, deploy many (thousands and beyond) of backups at the same time, and combine multiple settings into a single image. The mobile devices that may be in use during a deployment can be of many different models and operating system versions. It has been problematic in the past to deploy an image that was prepared using a particular model and operating system to a device that is of a different model or operating system. To avoid these types of issues, the improved system for cloud-managed mobile device administration may dynamically adapt user and device data for the device that it is deploying to. This may be accomplished through an analysis of the data, both regarding the device and data being deployed to it, a set of rules for modification, and a framework for modifying the data on the fly. The modification and framework for such modification may occur at the client-side 140.

Modern mobile devices are typically consumer-centric, and are thus designed to be self-maintaining or user-maintained. This may pose a problem for the enterprise environment, where many applications are designed for use on a particular version of the operating system. Enterprises often delay the deployment of operating system updates until their applications and settings have been fully vetted to run on that new version. The improved system for cloud-managed mobile device administration may offer administrators the ability disable, or otherwise discourage, users from installing updates or patches. The system may also include the capability for administrators to choose under which circumstances a device should be forced to update.

Privilege and role levels for product users allows an enterprise organization to divide responsibilities or enforce existing management hierarchy or best practices. This may be accomplished through multi-tiered administrative structure, where certain capabilities may be restricted to certain tiers and roles. Furthermore, the organization's domains and limits can be combined with tags to reflect natural divisions of labor within an enterprise, such as physical location or department.

The improved system for cloud-managed mobile device administration may employ the use of tags or customized fields throughout the system. Through these tags or customized fields, administrators or users can assign custom data to their Launchpads, purpose-built hardware appliances, and/or mobile devices. These tags or customized fields can differentiate Launchpads, purpose-built hardware appliances, or mobile devices by things such as school, store number, department, etc. Policies may be created to target assets based on these tags or customized fields.

The improved system for cloud-managed mobile device administration may be able to interface with MDM vendor's APIs. Through this mechanism, the improved system for cloud-managed mobile device administration can update the MDM about devices that are being configured and provisioned—such as informing the MDM what to expect from the mobile device, and allowing for the personalization of mobile devices to the MDM provider.

A set of public APIs may be available so that other software can be written or customized to access the features of the improved system for cloud-managed mobile device administration. Through this feature, it may be possible to perform advanced custom reporting or metrics gathering, and allows for other software to gather the status and history data that is stored within the system, amongst other benefits. It may be possible that software be written using the public API, such that actions are triggered by that software based on events or milestones that it detects through the API. The public API may also extend to the use of detecting tags or custom fields.

The system may provide a real-time reporting for actions that are currently being performed by the improved system for cloud-managed mobile device administration. This activity may be available to the system administrator that an activity page within the administration console. The real-time activity data may include per-device status and deployment information, progress and completed steps, among other information. Errors detected by the system may be reported in a manner that prioritizes specific types of errors and diagnostic information displayed to the administrator, which may make it easier to determine root cause of problems and implement the appropriate resolution. This type of prioritization may create a "friendly" error reporting system.

Figure 2:
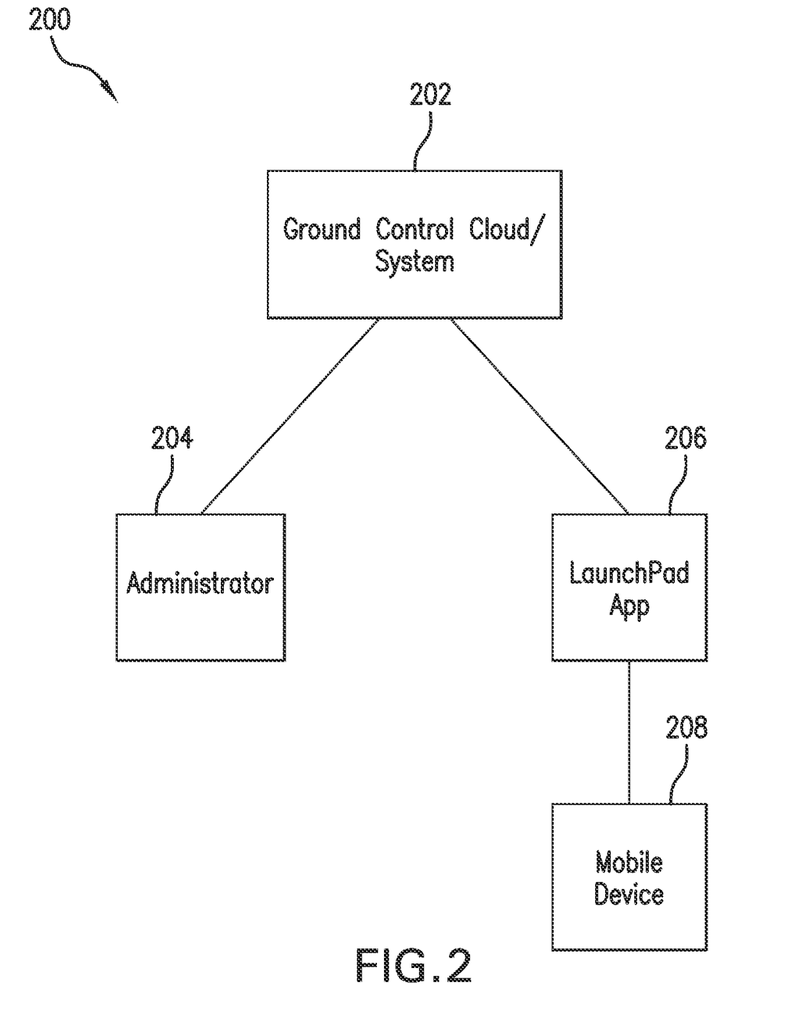
FIG. 2 is a system diagram of an improved software based Launchpad application in the improved system for cloud-managed mobile device administration, in accordance with some embodiments.

Turning to FIG. 2, shown is a system diagram for the Launchpad software application running on a traditional operating system. Shown is the systems administrator console 204, the cloud-based system 202, Launchpad application 206, and mobile device 208. The administrator console may or may not be accessed on the same machine that is hosting the Launchpad application. The administrator would logon onto the administrator console, which is hosted on the cloud-based system. The administrator may then configure policies, upload backups, or perform a myriad of other administrative tasks. If any new policies, firmware updates, or patches are available, they may be sent by the cloud-based system to the Launchpad application to be cached. When a mobile device is plugged into the computer running the Launchpad application a variety of actions may occur. When a device connects, an inventory of that device is performed, and the results of which are compared with any policies that are already in place. If a match is found against existing policies, then the device will be updated accordingly. If this is the first time the device has been connected, the administrator may choose to perform a device wipe and enroll the device into management. Regardless of if the device has been connected before or not, or if it matches with any of the policy-settings, the administrator may also choose to perform manual tasks on the device, such as backing up or restoring the device, performing an on-demand deployment to it, or various other administrative tasks.

Figure 3:
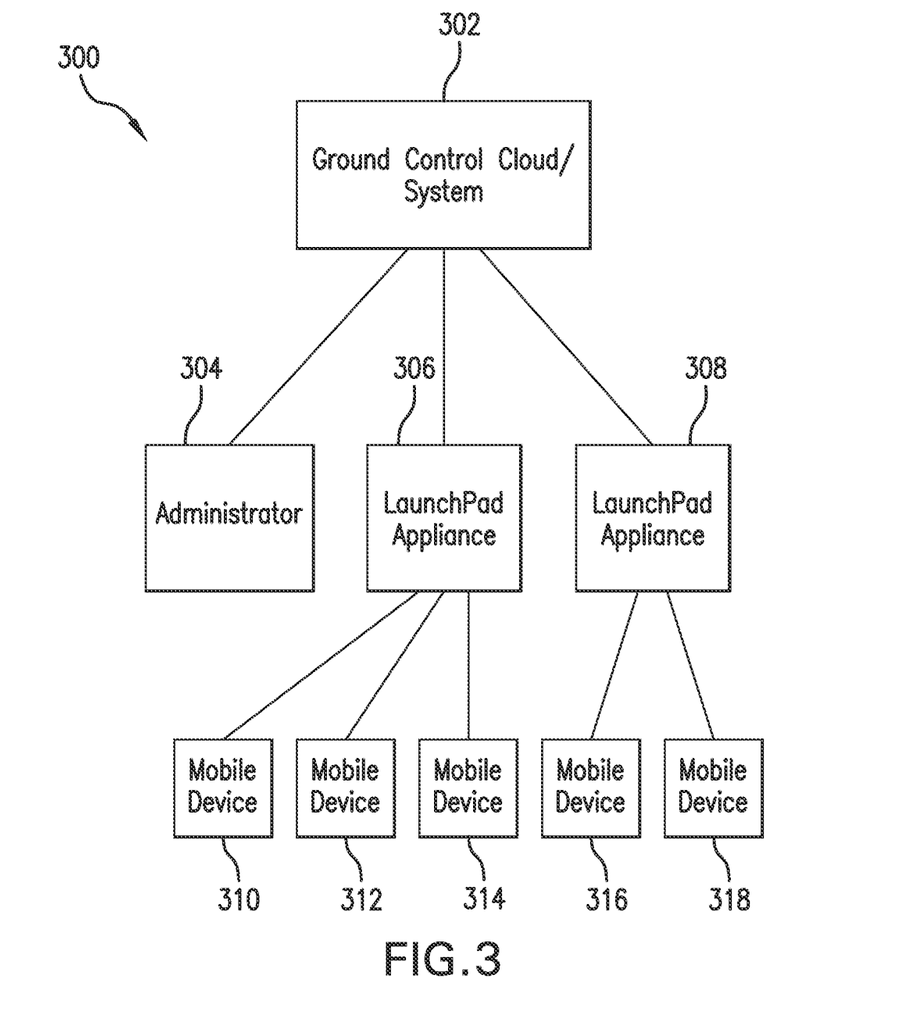
FIG. 3 is a system diagram of an improved purpose-built hardware appliance in the improved system for cloud-managed mobile device administration, in accordance with some embodiments.

Turning to FIG. 3, shown is a system diagram for the Launchpad purpose-built hardware appliance 300. Shown is the administrator console 304, the cloud-based system 302, Launchpad purpose-built hardware appliances 306, 308, and mobile devices 310, 312, 314, 316, 318. The administrator would logon onto the administrator console 304, which is hosted on the cloud-based system 302. The administrator may then configure policies, upload backups, or perform a myriad of other administrative tasks. If any new policies, firmware updates, or patches are available, they may be sent by the cloud-based system to the Launchpad purpose-built hardware appliance 306, 308 to be cached. When a mobile device 310, 312, 314, 316, 318 is plugged into the Launchpad purpose-built hardware appliance a variety of actions may occur. When a device connects, an inventory of that device is performed, and the results of which are compared with any policies that are already in place. If a match is found against existing policies, then the device will be updated accordingly. If this is the first time the device has been connected, the administrator may choose to perform a device wipe and enroll the device into management. Regardless of if the device has been connected before or not, or if it matches with any of the policy-settings, the administrator may also choose to perform manual tasks on the device, such as backing up or restoring the device, performing an on-demand deployment to it, or various other administrative tasks.

Figure 4:
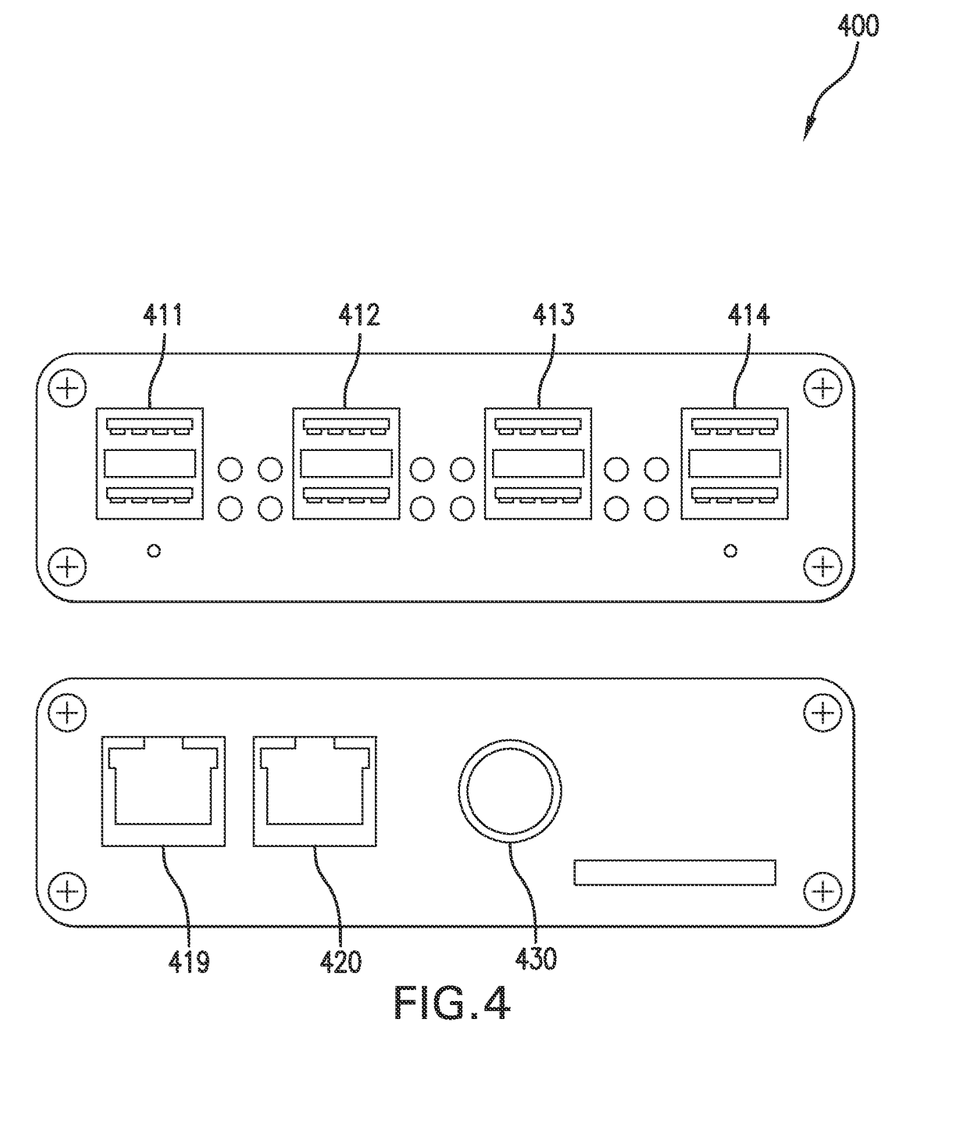
FIG. 4 is a system diagram of an improved purpose-built hardware appliance, in accordance with some embodiments.

Turning to FIG. 4, shown is a system diagram for an improved purpose-built hardware appliance. Shown are USB ports 411-418, Ethernet ports 419, 420, and a power port 430. The device may be powered through the Ethernet port 419, 420 using power-over-Ethernet, or through the power port. The device may operate in a mode that allows Ethernet pass-through, which would allow all traffic to flow on through the second Ethernet port 420. This design allows for the use of this device in situations where Ethernet ports may be scarce. The USB ports 411-418 may be connected directly to client devices, or they may be attached to external USB hubs to expand the capacity of the system. The purpose-built hardware appliances may be available in various sizes, and may include from 8 to beyond 96 USB ports. The device connects through the Ethernet port, through the client-provided Internet connection to the cloud-based system. Once connected it will be able to directly download firmware updates, patches, and other customer payload information. This data may be cached on the purpose-built hardware appliance's internal storage.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system comprising:
an administrative module comprising a frontend console and a central database;
a plurality of server modules associated with the administrative module wherein each server module comprises a server module interface for connecting with a mobile device group;
a plurality of mobile device groups wherein each of the plurality of mobile device groups is associated with one of the plurality of the server modules and wherein each of the mobile device groups includes at least one mobile device having mobile device data including device data and version data;
wherein the central database includes central data related to each of the plurality of mobile device groups and the mobile device data of at least one mobile device;
wherein the server module interface retrieves the mobile device data for the at least one mobile device via a wired interface and wherein the administrative module compares the mobile device data retrieved by the sever module interface with the central data when the at least one mobile device is connected to the server module interface;
wherein the server module interface provides installation data retrieved from the administrative module for the at least one mobile device when the at least one mobile device is connected to the server module interface via the wired interface; and
wherein the content of the installation data is selected by the administrative module based on the permission level of the at least one mobile device that is connected to the server module interface.

2. The system of claim 1, wherein the content of the installation data includes cryptographic keys to lock the at least one mobile device.

3. The system as in claim 2 wherein the content of the installation data is selected by the administrative module based on the device data of the at least one mobile device that is connected to the server module interface.

4. The system as in claim 2 wherein the content of the installation data is selected by the administrative module based on the version data of the at least one mobile device that is connected to the server module interface.

5. The system as in claim 4 wherein the administrative module does not provide installation data related to the most recent version of the version data.

6. The system as in claim 2 wherein the content of the installation data is selected by the administrative module based on the nature of the server module that is connected to the at least one mobile device via the server module interface of that server module.

7. The system as in claim 2 further comprising a hardware appliance for connecting to the at least one mobile device via the wired interface.

8. The system as in claim 2 wherein each of the plurality of mobile device groups are in separate geographical locations.

9. The system as in claim 2 wherein each of the plurality of mobile device groups are in separate functional groups.

10. A system comprising:
a network comprising:
an administrative module comprising a frontend console and a central database incorporating a plurality of customizable data properties controllable via the frontend console;
a plurality of server modules associated with the administrative module wherein each server module comprises a server module interface for connecting with a plurality of mobile devices having mobile device data;
wherein the central database includes central data related to the mobile device data of at least one mobile device;
wherein when the at least one mobile device is connected to the server module interface via a wired interface: 1) the server module interface retrieves the mobile device data for the at least one mobile device, 2) the administrative module compares the mobile device data retrieved by the sever module interface with the central data, 3) the administrative module provides instruction data to the server module interface based on the plurality of customizable data properties, and 4) the server module modifies the instruction data based on the properties of the at least one mobile device; and
a second central database including non-network data incorporating the plurality of customizable data properties that interfaces with the administrative module, wherein the plurality of customizable data properties include data related to the mobile device.

11. The system as in claim 10, further comprising when the at least one mobile device is connected to the server module interface via a wired interface: 5) the administrative module provides instruction data to the server module interface to prevent outside updates of the at least one mobile device.

12. The system as in claim 11 further comprising a hardware appliance for connecting to the at least one mobile device via the wired interface.

13. The system as in claim 10 wherein the plurality of customizable data properties also includes data related to the user of the mobile device.

14. The system as in claim 10 wherein the plurality of customizable data properties also includes data related to the location of the mobile device.

15. The system as in claim 10 wherein the non-network data is provided via an application device interface.

16. The system as in claim 15 further comprising a second network that furnishes the non-network data.

17. A system comprising:
a network comprising:
an administrative module comprising a frontend console, a central database having central data incorporating a plurality of customizable data properties controllable via the frontend console and a reporting module for reporting properties related to the central data;
a plurality of server modules associated with the administrative module wherein each server module comprises a server module interface for connecting with a plurality of mobile devices having mobile device data;
wherein the central data includes the mobile device data of at least one mobile device;
wherein, when the at least one mobile device is connected to the server module interface via a wired interface: 1) the server module interface retrieves the mobile device data for the at least one mobile device, 2) the administrative module compares the mobile device data retrieved by the sever module interface with the central data, and 3) the administrative module provides instruction data to the server module interface based on the plurality of customizable data properties
wherein the mobile device data comprises error data related to malfunctions of the mobile device and wherein the customizable data properties comprise aggregate error data related to the malfunctions of the network; and
wherein the frontend console reports on the relationship between the aggregate error data and the mobile device data.

18. The system as in claim 17, further comprising a second central database including second network data incorporating the plurality of customizable data properties that interfaces with the administrative module.

19. The system as in claim 17, further comprising a hardware appliance for connecting a plurality of the at least one mobile device via the wired interface.

20. The system as in claim 19, wherein the wired interface uses the USB protocol.

* * * * *